US008490949B2

(12) United States Patent
Lanning et al.

(10) Patent No.: US 8,490,949 B2
(45) Date of Patent: Jul. 23, 2013

(54) VALVE STEM ASSEMBLY FOR ROTARY VALVE AND METHOD

(75) Inventors: William W. Lanning, Montgomery, TX (US); Robert Eric Maki, Oklahoma City, OK (US)

(73) Assignee: Worldwide Oilfield Machine, Inc., Houston, TX (US)

( * ) Notice: Subject to any disclaimer, the term of this patent is extended or adjusted under 35 U.S.C. 154(b) by 366 days.

(21) Appl. No.: 12/835,071

(22) Filed: Jul. 13, 2010

(65) Prior Publication Data

US 2011/0240898 A1 Oct. 6, 2011

Related U.S. Application Data

(60) Provisional application No. 61/319,342, filed on Mar. 31, 2010, provisional application No. 61/333,517, filed on May 11, 2010.

(51) Int. Cl.
*F16K 5/06* (2006.01)

(52) U.S. Cl.
USPC ............. 251/315.09; 251/315.01; 251/315.14

(58) Field of Classification Search
USPC ............. 251/315.08, 315.09, 315.14, 315.15, 251/304, 305.01
See application file for complete search history.

(56) References Cited

U.S. PATENT DOCUMENTS

| | | | |
|---|---|---|---|
| RE13,542 E | | 3/1913 | Baldwin |
| 3,036,590 A | * | 5/1962 | Knox ........................ 137/315.02 |
| 3,179,121 A | * | 4/1965 | Bredtschneider et al. . 137/454.6 |
| 3,599,932 A | * | 8/1971 | Scaramucci .................. 251/151 |
| 3,705,707 A | * | 12/1972 | Scaramucci ..................... 251/84 |
| 4,044,994 A | * | 8/1977 | Priese .......................... 251/172 |
| 4,177,832 A | * | 12/1979 | Price ........................ 137/625.47 |
| 4,254,793 A | * | 3/1981 | Scaramucci ............. 137/246.22 |
| 4,265,427 A | * | 5/1981 | Vinciguerra ............. 251/315.15 |
| 4,878,651 A | | 11/1989 | Meyer, Jr. |
| 5,338,003 A | | 8/1994 | Beson |
| 5,494,256 A | | 2/1996 | Beson |
| 5,791,412 A | | 8/1998 | Myhre |
| 6,016,600 A | | 1/2000 | Kennell et al. |
| 6,260,822 B1 | | 7/2001 | Puranik |
| 6,279,875 B1 | | 8/2001 | Chatufale |
| 6,378,841 B1 | | 4/2002 | Russell |
| 6,575,426 B2 | | 6/2003 | Sundararajan |
| 6,601,650 B2 | | 8/2003 | Sundararajan |
| 6,609,533 B2 | | 8/2003 | Sundararajan |
| 6,684,897 B2 | | 2/2004 | Sundararajan |
| 6,966,537 B2 | | 11/2005 | Sundararajan |
| 7,040,408 B2 | | 5/2006 | Sundararajan et al. |

(Continued)

OTHER PUBLICATIONS

State Intellectual Property Office of the People's Republic of China Office Action Issued Oct. 9, 2012—Translated into English.

*Primary Examiner* — John K Fristoe, Jr.
*Assistant Examiner* — Marina Tietjen
(74) *Attorney, Agent, or Firm* — Kenneth L. Nash

(57) ABSTRACT

A valve body defines a valve stem opening. A valve stem comprises an enlarged portion greater than the valve stem opening to thereby secure the valve stem within the valve body by limiting radially outward movement of the valve stem with respect to the valve body. A rotary member comprise upper and lower bosses. Upper and lower split trunnions, with split components that can be inserted from opposite sides of the valve body, are used to rotationally support the upper and lower bosses to permit rotation of the rotary member while preventing axial movement of the axial flow path of the valve.

18 Claims, 2 Drawing Sheets

U.S. PATENT DOCUMENTS

| | | |
|---|---|---|
| 7,578,349 B2 | 8/2009 | Sundararajan et al. |
| 7,681,865 B2 | 3/2010 | Furnival |
| 2003/0193036 A1 | 10/2003 | Mike |
| 2005/0269542 A1 | 12/2005 | Scaramucci |
| 2008/0093575 A1 | 4/2008 | Church |
| 2009/0095931 A1 | 4/2009 | Stunkard |

* cited by examiner

VALVE STEM ASSEMBLY FOR ROTARY VALVE AND METHOD

This application claims benefit of U.S. Provisional Application No. 61/319,342 filed Mar. 31, 2010, and U.S. Provisional Application No. 61/333,517 filed May 11, 2010.

BACKGROUND OF THE INVENTION

1. Field of the Invention

The present invention relates generally to rotary valves and, more particularly, to an improved valve stem assembly.

2. Description of the Background

Larger diameter rotary valves, such as ball valves and plug valves, may typically utilize trunnions to secure the rotary element within the valve body. In other words, the rotary element is trunnion mounted. As an alternative to trunnion mounting of the rotary element, smaller valves may allow the rotary element to float within the valve body. In these smaller valves, an enlarged end may then be provided on the valve stem to retain the valve stem within the valve body. The enlarged end of the valve stem secures the valve stem in the valve body making the stem virtually blow out proof. However, for trunnion mounted rotary elements, the enlarged end cannot be used because the valve stem and rotary element cannot be inserted into the body due to the presence of the trunnions.

Therefore, in valves used in the last several decades, the trunnion mounted rotary elements utilize an external plate to secure the valve stem to the valve body. The plate is bolted onto the valve body. The valve stem may then have an enlarged end, which is larger than the opening in the plate bolted onto the valve but is not larger than the opening in the rotary valve through which the stem is used to engage and rotate the rotary element.

However in this type of valve, which has been used for decades, forces produced by the actuator by repeatedly opening and closing the valves may cause the bolts holding the plate to the body to fatigue whereupon there is a potential that the valve stem may be released from the valve when the valve is under pressure.

The prior art discussed above does not show a design that does not rely on body bolting or fasteners of any kind to retain the valve stem within the pressure area of a valve with a trunnion mounted rotary element. Those of skill in the art will appreciate the present invention that addresses the above needs and other significant needs, the solution to which are discussed hereinafter.

SUMMARY OF THE INVENTION

An object of the present invention is to provide an improved rotary valve.

Another object of the present invention is to provide a blowout proof valve stem, while using a trunnion mounted rotary element.

Yet another object of the present invention is to provide a valve body retained valve stem wherein the rotary element is trunnion mounted.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a rotary valve, which comprises a valve body, which defines a valve stem opening. The valve stem comprises an enlarged portion with a maximum diameter greater than the inner diameter of the valve stem opening, which thereby secures the valve stem within the valve body by limiting radially outward movement of the valve stem with respect to the valve body. A first set of split support elements comprises at least two separable sections which are mountable within the valve body from opposite sides of the valve body. When mounted within the valve body, the first set of split support elements may define a first opening therethrough.

In one embodiment, a rotary member has a first extension positioned within the first opening defined within the first set of split support elements whereby the first extension is rotatable within the first opening. The first extension is interconnectable with the valve stem within the valve body, whereby the rotary member rotates in response to rotation of the valve stem.

In one embodiment, the rotary valve may further comprise a second set of split support elements with at least two separable sections which are mountable within the valve body from opposite sides of the valve body.

When mounted within the valve body the second set of split support elements may in another possible embodiment define a second opening therethrough. In this embodiment, a second extension on the rotary member is positioned on an opposite side of the rotary member from the first extension. The second extension is positioned within the second opening defined within the first set of split support elements whereby the first extension is rotatable within the second opening.

The rotary valve may further comprise a first bearing mounted in the first opening around the first extension and a second bearing mounted in the second opening around the second extension.

The rotary valve further comprises a first end connector mountable to the valve body and a second end connector mountable to the valve body opposite to the first section. The first end connector and the second end connector secure the split support elements together within the valve body.

In one embodiment, the rotary member is ball shaped. In one embodiment, the first extension is cylindrical.

The rotary valve may further comprise a stem thrust washer mounted on the enlarged end of the valve stem which engages an inner surface of the valve body.

In another embodiment, a method for making a rotary valve comprises steps such as inserting a valve stem through an opening in a valve body and utilizing an enlarged portion of the valve stem which does not pass through the opening to retain the valve stem within the valve body.

Other steps may comprise inserting a rotary element into the valve body, whereby an upper extension of the rotary element engages the valve stem, and supporting a first extension on the rotary valve for rotational movement by inserting a first set of split support elements from opposite ends of the valve body.

The method may also comprise supporting a second extension on the rotary valve for rotational movement by inserting a second set of split support elements from opposite ends of the valve body. In this case, the method may comprise utilizing a first end connector and a second end connector for securing the first set of split support elements and the second set of split support elements within the valve body. The method may comprise positioning a first bearing around the first extension and positioning a second bearing around the second extension.

In one embodiment, the method may comprise positioning a thrust washer on the enlarged end of the valve stem to engage an inner surface of the valve body.

In one embodiment, the method may comprise providing that the first set of split support elements define a first opening which receives the first extension.

In another possible embodiment, the rotary valve, may comprise a valve body, which defines a valve stem opening, a valve stem with an enlarged portion greater than the valve stem opening to thereby secure the valve stem. A rotary member may comprise a first portion at one side thereof. A first set of split support elements may comprise at least two separable sections which are mountable within the valve body from opposite sides of the valve body. The first set of split support elements constrain the first portion of the rotary member for rotational movement. The rotary member is interconnectable with the valve stem within the valve body, whereby the rotary member rotates in response to rotation of the valve stem. The rotary member comprises a second portion at a second side of the rotary member opposite to the first side.

In one embodiment, a second set of split support elements may comprise at least two separable sections which are mountable within the valve body from opposite sides of the valve body. Once mounted within the valve body, the second set of split support elements constrain the first portion of the rotary member for rotational movement and prevent axial movement along the axis of the flow path through the valve.

In one embodiment, the first portion of the rotary member comprises a first cylindrical extension and the second portion of the rotary member comprises a second cylindrical extension.

In another embodiment, a rotary valve may comprise a valve body, which defines a valve stem opening, and a valve stem with an enlarged portion relative to the valve stem opening to thereby secure the valve stem within the valve body.

The rotary member may comprise upper and lower bosses. Upper and lower split trunnions may be utilized to rotationally support the upper and lower bosses for rotation of the rotary member.

The rotary valve may further comprise upper and lower trunnion bearings around the upper and lower bosses.

In another embodiment, a method for making a rotary valve may comprise inserting a valve stem through an opening in a valve body whereby the opening retains a relatively enlarged portion of the valve stem within the valve body.

Other steps may comprise inserting a rotary element into the valve body whereby an upper boss engages the valve stem, which may be enlarged portion of the valve stem.

Additionally, the method may comprise supporting upper and lower bosses on the rotary valve by inserting upper and lower split trunnion elements from opposite ends of the valve body.

BRIEF DESCRIPTION OF THE DRAWING

Various other objects, features and attendant advantages of the present invention will become fully appreciated as the same becomes better understood when considered in conjunction with the accompanying drawing, and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PRESENTLY PREFERRED EMBODIMENTS

Figure 1:
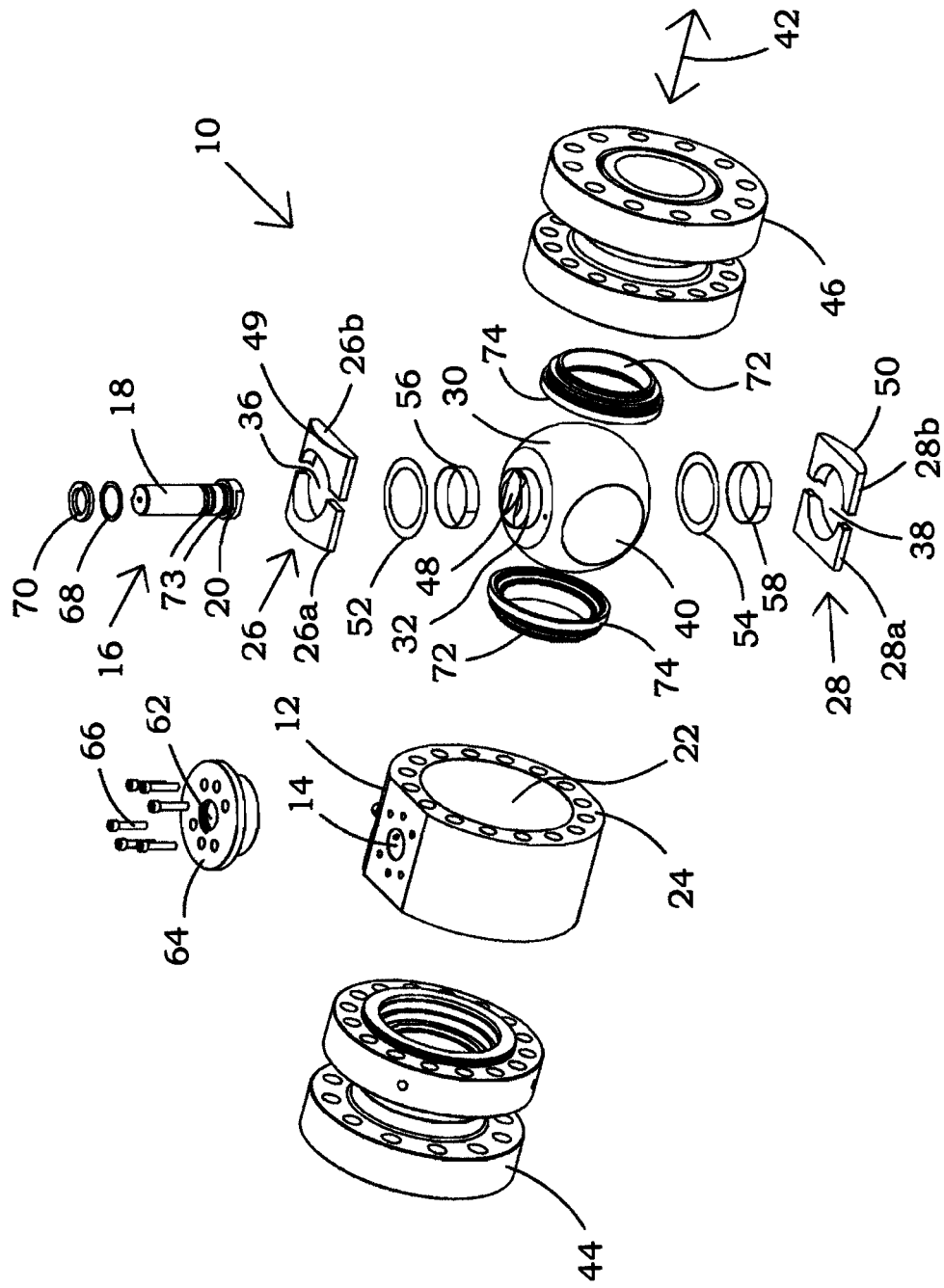
FIG. 1 is an exploded view, in perspective, showing a rotary valve with body retained valve stem and split trunnions in accord with one possible embodiment of the present invention.
Figure 2:
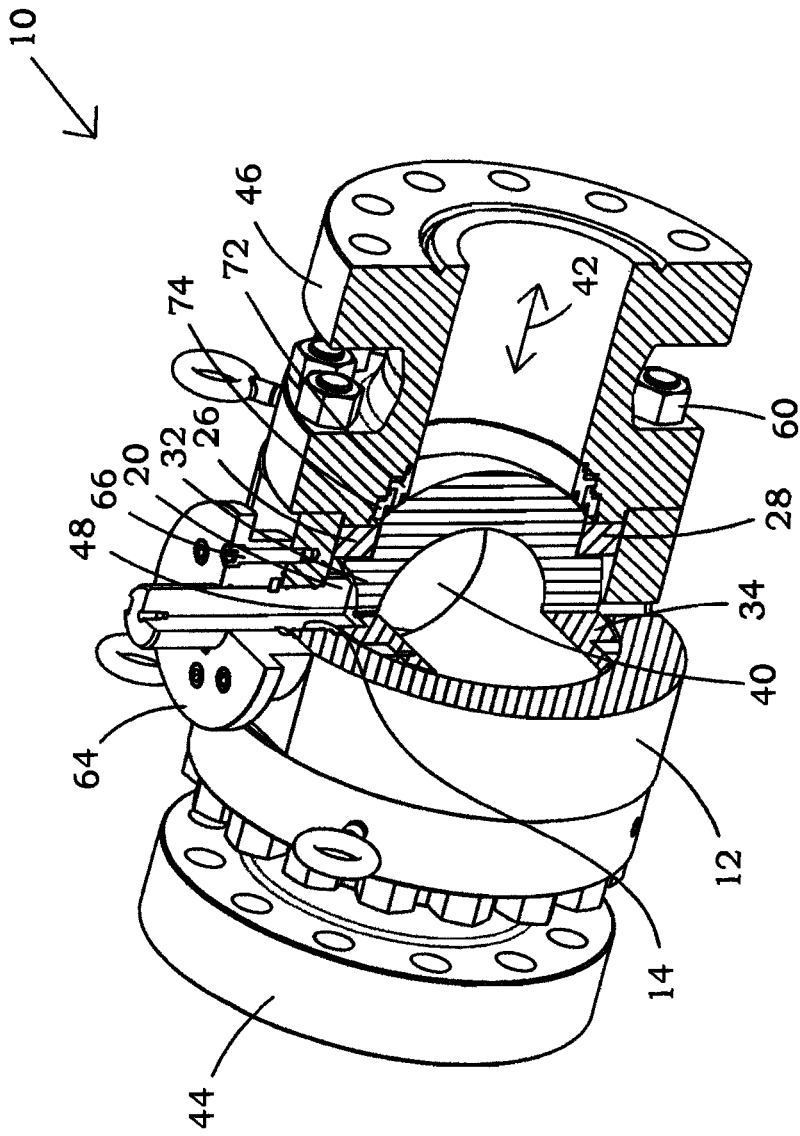
FIG. 2 is a perspective view, partially in section, showing the rotary valve of FIG. 1 in accord with one possible embodiment of the present invention.

Referring now to the drawings, and more particularly to FIG. 1 and FIG. 2, the present invention teaches rotary valve 10, in this case a ball valve, which provides a body retained valve stem 16 within valve body 12.

Valve body 12 defines valve stem opening 14 therein. In one embodiment, valve stem opening 14 is a straight-sided cylindrical opening. However, valve stem opening 14 could also have other configurations. Valve stem 16 may comprise cylindrical elongate body 18 with enlarged portion 20 at one end thereof, which may also be cylindrically shaped. Enlarged portion 20 is greater in diameter than valve stem opening 14 and is therefore retained within valve body 12 with the full strength of wall 24 of valve body 12, and without the need for reliance on bolts or fasteners.

Enlarged portion 20 may be formed in different ways and, in this embodiment, can comprise any enlarged component or portion of valve stem 16 which directly or indirectly engages an interior surface of valve body wall 24 or an interior portion of valve stem opening 14 to limit radially outward movement of valve stem 16 and retain valve stem 16 within valve body 12. As a different example, enlarged end 20 might comprise a thrust bearing or the like which is enlarged with respect to valve stem opening 14.

In another example, valve stem 16 might comprise a conical or tapered portion which engages a conical or tapered portion of valve stem opening 14. Thus, valve stem opening 14 and valve stem 16 are designed with any suitable proportions such that valve stem 16 has a portion which has a larger diameter than at least a portion of valve stem opening 14 so that valve stem 16 is retained within valve body 12.

During assembly of this embodiment, cylindrical elongate end 18 of valve stem 16 is inserted into the interior side of valve stem opening 14 in valve body 12. Enlarged end 20 is then positioned within body interior 22 of valve body 12 whereby the interior surface of valve body 12 prevents further radially outwardly movement of valve stem 16. In this way, the thickness of wall 24 of valve body 12 securely retains valve stem 16 within valve body 12, making a blowout proof, body-retained valve stem 16. Prior to insertion through valve stem opening 14, seals, bearings, and the like may be utilized on valve stem 16. While there are many possible arrangement of such elements, in this embodiment, stem thrust washer 68, upper stem seal 70, and O-ring stem seals 72 are utilized. Stem thrust washer 68 then engages the interior surface of wall 24 of valve body 12.

In this embodiment, to enable assembly of a trunnion mounted rotary valve 10 with body retained valve stem 16, split upper and lower trunnions 26 and 28 are utilized. The split trunnions comprise separate components 26a, 26b, and 28a, 28b that can be inserted from opposite sides of valve body 12.

Depending on the design of the components, lower trunnion 28 may not need to be split, if desired, due to the absence of the need for a valve stem on the lower side. However, at least upper trunnion 26 is preferably split so that upper trunnion 26 can be inserted into valve body 12 after the rotary element 30 is inserted into valve body 12, and after valve stem 16 is inserted into the valve body.

As used herein, a trunnion is a support element, which is used to support the upper and lower portions of rotary element 30 in valve body 12 for constraining movement of rotary element 30 to rotational movement without axial movement along the axis of flow path 42 through rotary valve 12. In other words, rotary element 30 does not "float" along the axis of the flow path as in other types of rotary valves discussed hereinbefore. Thus, the term "support element" or "split support element" may also be utilized to refer to upper and/or lower trunnions 26 and 28. The trunnions engage upper and lower portions of rotary element 30, which may be of various shapes and which may or may not comprise extensions or protuberances of rotary element 30.

In this embodiment, upper and lower split trunnions 26 and 28 are provided to secure or support upper and lower bosses 32 and 34. Upper and lower bosses 32 and 34 can be but are not required to be protuberant parts or extensions on the upper and lower sides of rotary element 30. In this embodiment, upper and lower bosses 32 and 34 comprise cylindrically shaped extensions with a substantially constant diameter over their length.

However, the diameter of upper and lower bosses 32 and 34 is not required to be constant, nor is the protuberance or extension required to be straight-sided. For instance, the extension could be rounded where upper boss 32 now appears to comprise a straight sided cylinder. As another example, the upper and lower bosses may comprise an upper portion of the surface of rotary element 30 without an extension.

Essentially, upper and lower bosses 32 and 34 are mounting support regions on rotary element 30 which are supported by the upper and lower trunnions so as to be constrained to rotational movement without axial movement along axial flow path 42. This contrasts with the floating rotational element of other rotary valves. Upper and lower bosses 32 and 34 need not be extensions but may comprise any possible type of pivot region for rotary element 30 to be supported for or constrained to rotational movement of rotary element 30 while preventing axial movement along axial flow path 42.

In this embodiment, upper and lower trunnions 26 and 28 define upper and lower mating cylindrical openings 36 and 38 that support upper and lower bosses 32 and 34 for rotary movement of rotary element 30 within valve body 12 to open and close rotary valve 10. The openings or engagement surfaces formed on upper and lower trunnions 26 and 28 mate to upper and lower bosses 32 and 34 comprise openings and/or bearing surfaces of any shape that conforms to the bosses. While openings 36 and 38 comprise straight-sided constant diameter cylindrical openings in this example, as another example, openings 36 and 38 may comprise tapered and/or curved diameter openings.

Flow opening 40 through rotary element 30 can be rotated parallel or perpendicular to flow path 42 to open and close rotary valve 10. Flow path 42 may be cylindrical and passes axially through valve 10 when flow opening 40 is open.

Upper and lower trunnion components 26a, 26b and 28a, 28b are compressed together within body interior 22 and held in place by end connectors 44 and 46 to thereby secure upper and lower bosses 32 and 34 so movement of rotary element 30 is constrained to rotational movement without axial movement along flow path 42. In other words, rotary element 30 is not a so-called floating rotary element.

After valve stem 16 is inserted into valve body 12, rotary element 30 can then be inserted into valve body 12 for locking engagement with valve stem 16. In this embodiment, valve stem 16 comprises an interlocking member that is inserted into mating groove 48 in upper boss 32 to rotationally affix valve stem 16 to upper boss 32 whereby rotation of valve stem 16 results in corresponding rotation of rotary element 30. However, various types of interlocking members may be utilized for rotationally affixing or locking valve stem 16 to upper boss 32 and the shown interlocking member and mating groove 48 is only one example thereof.

During assembly of rotary valve 10, as indicated in FIG. 1 and FIG. 2, end 18 of valve stem 16 is inserted through valve stem opening 14 from interior 22 of valve body 12. Thus, enlarged portion or end 20 or a thrust bearing or the like engages with an interior surface valve body wall 24 to prevent valve stem 16 from being radially outwardly expelled from rotary valve 10 even when rotary valve 10 is under high pressure. Rotary element 30 can then be inserted into valve body 12 whereby valve stem 16 interlocks with slot 48 in upper boss 32 of rotary element 30.

Afterwards, upper and lower split trunnions 26 and 28 can be inserted on opposite sides of valve body 12 to provide that rotary element 30 is trunnion mounted. It will be appreciated that the trunnion/boss mounting can be of many different configurations. In this case, upper and lower split trunnions 26 and 28 are generally rectangular when assembled together and comprise curved outer surfaces 49 and 50. When assembled, openings 36 and 38 are slightly larger in inner diameter than the outer diameter of cylindrical bosses 32 and 34.

Prior to insertion of rotary element 30 into valve body 12, upper and lower thrust washers 52 and 54 may be positioned on upper and lower bosses 32 and 34. Upper and lower rotary trunnion bearings 56 and 58 may also be positioned on upper and lower bosses 32 and 34. Rotary element 30 may then be tilted during insertion so that groove 48 can first engage with valve stem 16 without damaging upper rotary bearing 56.

In this embodiment of rotary valve 10, rotary element 30 is ball shaped. However, the present invention might be utilized with any type of rotary valve, such as ball valves, plug valves, and the like.

In this embodiment, a set of primary seals 72 and secondary seals 74 are utilized to seal between cylindrical flow path 42 through rotary valve 10 and opposite sides of rotary element 30. However, other seals can also be utilized to seal rotary element 30 in accord with the present invention, if desired.

End connectors 44 and 46 of valve 10 secure the trunnions, seals, and other elements within valve body 12 utilizing fasteners, screws, bolts, studs, nuts and/or the like as indicated at 60.

Valve stem 16 also extends through opening 62 in adaptor plate 64, which is utilized and mounted by fasteners, screws, bolts, studs, nuts and/or the like as indicated at 66. However, adaptor plate 64 is not necessary for securing valve stem 16 to valve body 12. Instead, valve stem 16 is inserted into valve body 12 so that enlargement 20, which in this embodiment is on the bottom end of valve stem 16, retains valve stem 16 within valve body 12 without the need for fasteners. In this embodiment, adaptor plate 64 is used for connecting an actuator (not shown) to valve body 12.

During assembly, O-ring seals 73, upper stem seal 70 and thrust washer bearing 68 may be positioned on valve stem 16. Thrust washers 52, 54 and rotary trunnion bearings 56, 58 are placed on upper and lower bosses 32, 34 of rotary element 30. If desired, rotary element 30 can then be inserted into valve body 12 at an angle so that the connector on valve stem 16 engages groove 48 or other interconnection element on upper boss 32 of rotary element 30. With these components in place within valve body 12, then upper and lower split trunnions 26, 28 can be inserted around upper and lower bosses 32, 34 from opposite sides of valve body 12. Primary 72 and secondary seal 74 assemblies are installed on opposite sides of rotary element 30 and end connectors 44 and 46 are attached to opposite sides of valve body 12. Then actuator adaptor plate 64 can be bolted into place using ferryhead screws 66, or the like.

In general, it will be understood that such terms as "up," "down," "vertical," and the like, are made with reference to the drawings and/or the earth and that the devices may not be arranged in such positions at all times depending on variations in operation, transportation, mounting, and the like. For example, terms such as "upper" and "lower" might also be replaced by terms such as "first" and "second" herein. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. One of skill in the art upon reviewing this specification will understand that the relative size and shape of the components may be greatly different from that shown and the invention can still operate in accord with the novel principals taught herein.

Accordingly, the foregoing disclosure and description of the invention is illustrative and explanatory thereof, and it will be appreciated by those skilled in the art, that various changes in the ordering of steps, ranges, interferences, spacings, hardware, and/or attributes and parameters, as well as in the details of the illustrations or combinations of features of the methods and system discussed herein, may be made without departing from the spirit of the invention.

What is claimed is:

1. A rotary valve, comprising:
   a valve body, which defines a valve stem opening and a fluid flow path through said valve body;
   a valve stem comprising an enlarged portion, said enlarged portion comprising a diameter greater than said valve stem opening to thereby secure said valve stem within said valve body by limiting radially outward movement of said valve stem with respect to said valve body;
   a first set of split support elements comprising at least two separable sections which are separately mountable within said valve body from opposite sides of said fluid flow path through said valve body with respect to said valve stem, and when mounted within said valve body said first set of split support elements define a first circular opening therethrough;
   a rotary member with a first extension, said first extension being positioned within said first circular opening defined within said first set of split support elements whereby said first extension is rotatable within said first circular opening, said first extension being interconnectable with said valve stem within said valve body, whereby said rotary member rotates in response to rotation of said valve stem for controlling fluid flow through said fluid flow path through said valve body.

2. The rotary valve of claim 1, further comprising a second set of split support elements comprising at least two separable sections which are separately mountable within said valve body from opposite sides of said fluid flow path through said valve body, when mounted within said valve body said second set of split support elements defining a second circular opening therethrough, a second extension on said rotary member positioned on an opposite side of said rotary member from said first extension, said second extension being positioned within said second circular opening defined within said second set of split support elements whereby said second extension is rotatable within said second circular opening.

3. The rotary valve of claim 2, further comprising a first bearing mounted in said first circular opening around said first extension and a second bearing mounted in said second circular opening around said second extension.

4. The rotary valve of claim 1, further comprising a first end connector which encircles said fluid flow path mountable to said valve body, a second end connector which encircles said fluid flow path mountable to said valve body opposite to said first end connector, said first end connector and said second end connector securing said first set of split support elements together within said valve body.

5. The rotary valve of claim 1, wherein said rotary member is ball shaped.

6. The rotary valve of claim 1, further comprising a stem thrust washer mounted on said enlarged portion of said valve stem which engages an inner surface of said valve body.

7. The rotary valve of claim 1, wherein said first extension is cylindrical.

8. A method for making a rotary valve, comprising:
   inserting a valve stem through an opening in a valve body and utilizing an enlarged portion of said valve stem which does not pass through said opening to retain said valve stem within said valve body;
   inserting a rotary element into said valve body, whereby an upper extension of said rotary element engages said valve stem;
   supporting a first extension on said rotary valve for rotational movement by inserting first and second components of a first set of split support elements from opposite ends of a flow path through said valve body, whereby after insertion into said valve body said first set of split support elements define a first circular opening within said valve body for supporting said first extension.

9. The method of claim 8, comprising supporting a second extension on said rotary valve for rotational movement by inserting a second set of split support elements from opposite ends of said flow path through said valve body, said second set of split support elements defining a second circular opening therethrough for supporting said second extension.

10. The method of claim 9, comprising utilizing a first end connector and a second end connector for securing said first set of split support elements and said second set of split support elements within said valve body.

11. The method of claim 10, comprising positioning a first bearing around said first extension, and positioning a second bearing around said second extension.

12. The method of claim 8, comprising positioning a thrust washer on said enlarged portion of said valve stem to engage an inner surface of said valve body.

13. A rotary valve, comprising:
   a valve body, which defines a valve stem opening;
   a valve stem comprising an enlarged portion, said enlarged portion comprising a diameter greater than said valve stem opening to thereby secure said valve stem within said valve body by limiting radially outward movement of said valve stem with respect to said valve body;
   a rotary member comprising a first portion at a first side thereof;
   a first set of split support elements comprising at least two separable sections defining a first circular opening when interconnected which are separately mountable within said valve body from opposite sides of said valve body, said first set of split support elements constraining said first portion of said rotary member for rotational movement, said rotary member being interconnectable with said valve stem within said valve body, whereby said rotary member rotates in response to rotation of said valve stem.

14. The rotary valve of claim 13, wherein said rotary member comprises a second portion at a second side of said rotary member opposite to said first side, and a second set of split support elements comprising at least two separable sections defining a second circular opening which are separately mountable within said valve body from opposite sides of said valve body, when mounted within said valve body said second set of split support elements constraining said second portion of said rotary member for rotational movement.

15. The rotary valve of claim 14, wherein said first portion of said rotary member comprises a first cylindrical extension and said second portion of said rotary member comprises a second cylindrical extension.

16. A rotary valve, comprising:
a valve body, which defines a valve stem opening, said valve body defining a flow path through said rotary valve;
a valve stem comprising an enlarged portion, said enlarged portion comprising a diameter greater than a diameter of said valve stem opening to thereby secure said valve stem within said valve body by limiting radially outward movement of said valve stem with respect to said valve body;
a rotary member comprising first and second bosses on opposite sides of said rotary member, said rotary member being connectable with said valve stem within said valve body, whereby said rotary member rotates in response to rotation of said valve stem so as to be operable for controlling fluid flow through said flow path;
first and second trunnions, said first and second trunnions defining a first circular opening and a second circular opening respectively, said first and second trunnions rotationally supporting said first and second bosses for rotation of said rotary member while preventing axial movement along an axis of said flow path through said rotary valve wherein said first and second trunnions each comprise at least two separable sections which are separately mountable within said valve body from opposite sides of said valve body.

17. A method for making a rotary valve, comprising:
inserting a valve stem through an opening in a valve body, whereby said opening is sized smaller than an enlarged portion of said valve stem to retain said enlarged portion of said valve stem within said valve body;
inserting a rotary element into said valve body, whereby an upper boss engages said valve stem;
utilizing trunnions to mount said rotary element, wherein said trunnions define a circular opening for constraining movement of said rotary element to rotational movement of said rotary element within said valve body while preventing axial movement of said rotary element along an axis of a flow path through said rotary valve; and
wherein said step of utilizing trunnions further comprises utilizing separated sets of upper and lower split trunnions wherein each of said separated sets of upper and lower split trunnions comprise separable components, and further supporting an upper boss and a lower boss on said rotary element by inserting said separable portions of said separated sets of upper and lower split trunnions into said valve body.

18. The method of claim 17, wherein said step of utilizing trunnions further comprises inserting said separable portions of said separated sets of upper and lower split trunnions into said valve body from opposite sides of said flow path through said valve body.

* * * * *

UNITED STATES PATENT AND TRADEMARK OFFICE
CERTIFICATE OF CORRECTION

PATENT NO. : 8,490,949 B2
APPLICATION NO. : 12/835071
DATED : July 23, 2013
INVENTOR(S) : William W. Lanning and Robert Eric Maki It is certified that error appears in the above-identified patent and that said Letters Patent is hereby corrected as shown below:

In the Claims

Column 10, line 27, cancel the text "an" where referring to "an upper boss" and replace with the text "said".

Signed and Sealed this
Twenty-fourth Day of September, 2013

Teresa Stanek Rea
*Deputy Director of the United States Patent and Trademark Office*